US009479099B2

(12) United States Patent
Zhao et al.

(10) Patent No.: US 9,479,099 B2
(45) Date of Patent: *Oct. 25, 2016

(54) STATOR FLUX MAGNITUDE AND DIRECTION CONTROL STRATEGIES FOR PERMANENT MAGNET SYNCHRONOUS MOTORS

(71) Applicant: Infineon Technologies AG, Neubiberg (DE)

(72) Inventors: Tao Zhao, Singapore (SG); Arno Rabenstein, Singapore (SG); Theng Kiong Gan, Singapore (SG); Choon Keat Kok, Singapore (SG); Sze Main Wong, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 161 days.

This patent is subject to a terminal disclaimer.

(21) Appl. No.: 14/168,144

(22) Filed: Jan. 30, 2014

(65) Prior Publication Data
US 2014/0210386 A1    Jul. 31, 2014

Related U.S. Application Data

(60) Provisional application No. 61/758,757, filed on Jan. 30, 2013.

(51) Int. Cl.
*H02P 21/00* (2016.01)
*H02P 21/12* (2016.01)

(52) U.S. Cl.
CPC ............... *H02P 21/12* (2013.01); *H02P 21/36* (2016.02)

(58) Field of Classification Search
CPC .. H02P 21/0035; H02P 21/146; H02P 21/06; Y02T 10/643

USPC ............. 318/400.02, 432, 727, 599, 811
See application file for complete search history.

(56) References Cited

U.S. PATENT DOCUMENTS

| | | | | |
|---|---|---|---|---|
| 5,467,000 A * | 11/1995 | Bauer | ................. | H02P 21/0035 318/432 |
| 5,714,857 A * | 2/1998 | Mannel | ................. | H02P 25/022 318/432 |
| 6,388,419 B1 * | 5/2002 | Chen | ....................... | B60L 11/14 318/727 |
| 6,838,860 B2 * | 1/2005 | Huggett | ................ | H02J 3/1842 322/28 |
| 6,940,251 B1 * | 9/2005 | Sarlioglu | ................ | H02P 21/00 318/400.34 |
| 7,075,264 B2 * | 7/2006 | Huggett | .............. | H02P 21/0042 318/363 |
| 7,659,685 B2 * | 2/2010 | Cesario | .................. | G05B 13/04 318/568.13 |
| 7,733,677 B2 * | 6/2010 | Cheng | ................. | H02M 1/4233 363/127 |

(Continued)

OTHER PUBLICATIONS

Infineon Technologies AG "XE 166 Family: Application Note." Published Jul. 2009. 41 Pages.

(Continued)

*Primary Examiner* — Rina Duda
(74) *Attorney, Agent, or Firm* — Eschweiler & Associates, LLC

(57) ABSTRACT

The present disclosure relates to a motor control circuit and related method that includes a transform component configured to receive current values associated with a motor being driven by the motor control circuit, and output polar coordinate values representing a magnitude component and a direction component of a current space vector. The motor control circuit further includes a control component configured to receive the magnitude component and the direction component of the current space vector, and generate motor control signals for driving the motor.

8 Claims, 12 Drawing Sheets

(56) References Cited

U.S. PATENT DOCUMENTS

| | | | | |
|---|---|---|---|---|
| 7,821,145 B2* | 10/2010 | Huang | ..................... | F02N 11/04 290/31 |
| 2004/0062062 A1* | 4/2004 | Lee | ..................... | H02P 21/0092 363/37 |
| 2010/0001669 A1* | 1/2010 | Olomski | ............... | H02P 21/146 318/400.06 |

OTHER PUBLICATIONS

Musil, Jaroslav. "Sensorless Sinusoidal PMSM Gas Compressor on MC56F80xx." Freescale Semiconductor. Published Sep. 2011. 11 Pages.

Akin, et al. "Sensorless Field Oriented Control of 3-Phase Permanent Magnet Synchronous Motors." Texas Instruments. Published Mar. 2011. 42 Pages.

Renesas. Three Shunt Sensorless Vector Control of PMSM Motors: RX62T Application Note. Published Nov. 18, 2011. 23 Pages.

Zambada, et al. "Sensorless Field Oriented Control of a PMSM." Microchip Technology Inc. Published Mar. 2010. 28 Pages.

Cheles, Mihai. "Sensorless Field Oriented Control (FOC) for a Permanent Magnet Synchronous Motor (PMSM) Using a PLL Estimator and Field Weakening (FW)." Microchip Technology Inc. Published Sep. 2009. 20 Pages.

ST. "Digital PFC and dual FOC MC integration." Published Jul. 2010. 31 Pages.

Microsemi. "Field Oriented Control of Permanent Magnet Synchronous Motors User's Guide." Published Jun. 2012. 43 Pages.

Fujitsu. "32-Bit Microcontroller Phased Lock Loop." Published Jul. 4, 2011. 16 Pages.

U.S. Appl. No. 14/168,187, filed Jan. 30, 2014. 33 Pages.

Final Office Action Dated Feb. 9, 2016 U.S. Appl. No. 14/168,187.

Non Final Office Action Dated Sep. 4, 2015 U.S. Appl. No. 14/168,187.

Notice of Allowance Dated May 17, 2016 U.S. Appl. No. 14/168,187.

\* cited by examiner

STATOR FLUX MAGNITUDE AND DIRECTION CONTROL STRATEGIES FOR PERMANENT MAGNET SYNCHRONOUS MOTORS

BACKGROUND

Permanent magnet synchronous motor (PMSM) has a growing adoption in consumer and industrial motor applications due to its high reliability and small size compared to other motors. To achieve high efficiency and low vibration and acoustic noise, field oriented control (FOC) is increasingly being used in PMSM control for fans, pumps, compressors, geared motors, etc. To further increase energy efficiency at a lowest cost, more and more new functions (e.g., digital power conversion, digital power factor correction (PFC), multiple PMSM control in air-con) need to be handled by one single microcontroller. But existing FOC control strategies are complicated and processor-intensive, thereby impeding additional microcontroller power from being allocated to those complex new system functions.

For PMSM with highly dynamic loading (e.g., motors for electric propulsion, compressors), a fast and accurate control loop is needed to control motor currents and voltages to consistently maintain maximum efficiency. But existing FOC has complex transformations in the critical control loop, making it inaccurate and relative slow.

New microcontrollers include more and more features and peripherals (e.g., human machine interface (HMI), communications) in order to excel in the intensely fierce competition. However, existing FOC control strategies tend to overburden the microcontrollers, hindering the full use of their potential and features in complex applications with FOC motor controls.

DETAILED DESCRIPTION

Figure 1A:
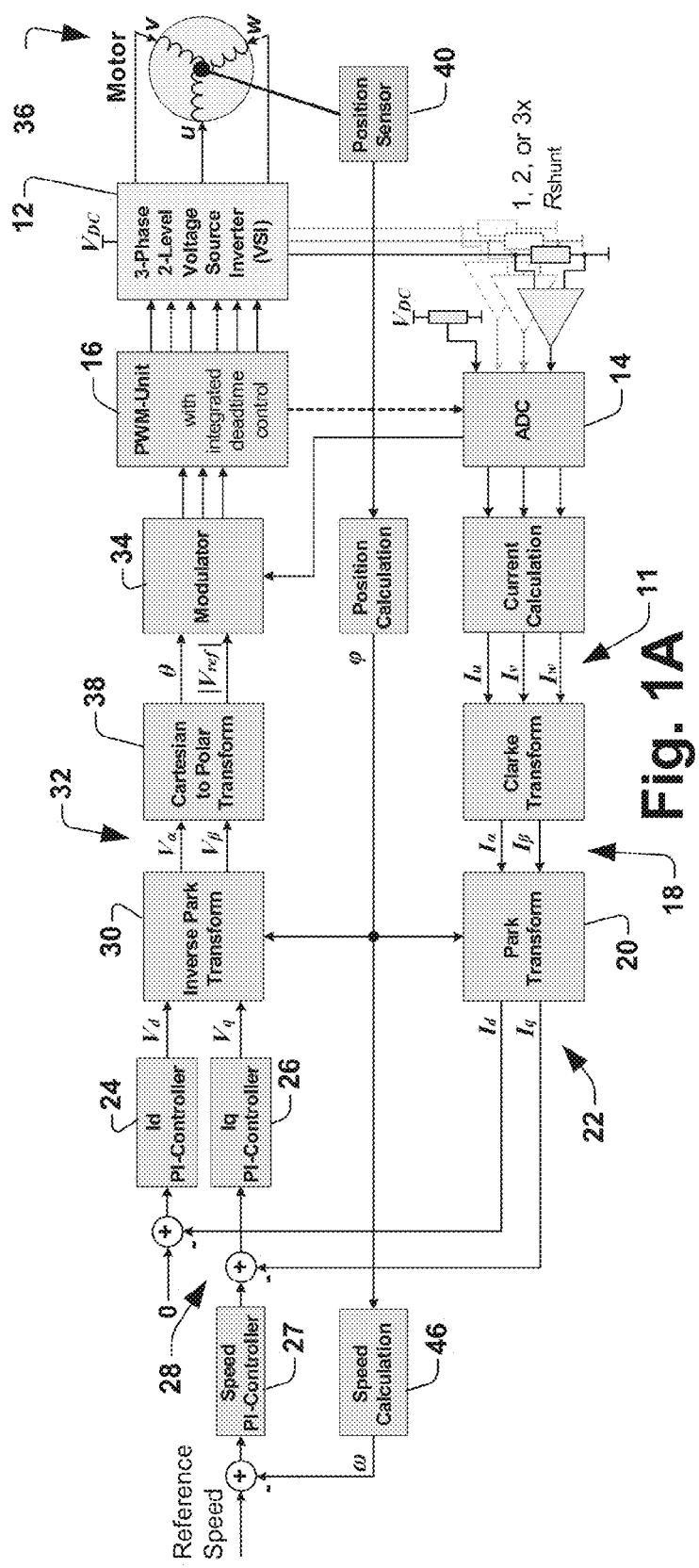
FIG. 1A is a schematic diagram illustrating a conventional sensored FOC control strategy.

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one skilled in the art, that one or more aspects described herein may be practiced with a lesser degree of these specific details. In other instances, known structures and devices are shown in block diagram form to facilitate understanding.

To address some of the above mentioned shortcomings, the present disclosure proposes new sensored and sensorless stator flux magnitude and direction control strategies for PMSM. Without a computation-intensive Park Transform and Inverse Park Transform which were heretofore indispensable in the existing FOC, the new control strategies have a simplified structure, a faster control loop, and a decreased CPU time utilization. In complex applications with PMSM motor control, the new strategies will boost the performance of the microcontrollers and the whole system.

The existing FOC transforms three phase signals into two rotor-fix signals and vice-versa, with complex Cartesian reference frame transformations (e.g., employing a Park Transform and an Inverse Park Transform) in the control loop, which is supposed to be fast. These reference frame transformations are computation-intensive and are inclined to introduce extra calculation errors, resulting in a slow current control loop and a poor response to dynamic motor loads, and making it difficult to handle more composite system functions (e.g., digital PFC, multiple FOC motor controls, digital power conversion) with only one single microcontroller.

Figure 1B:
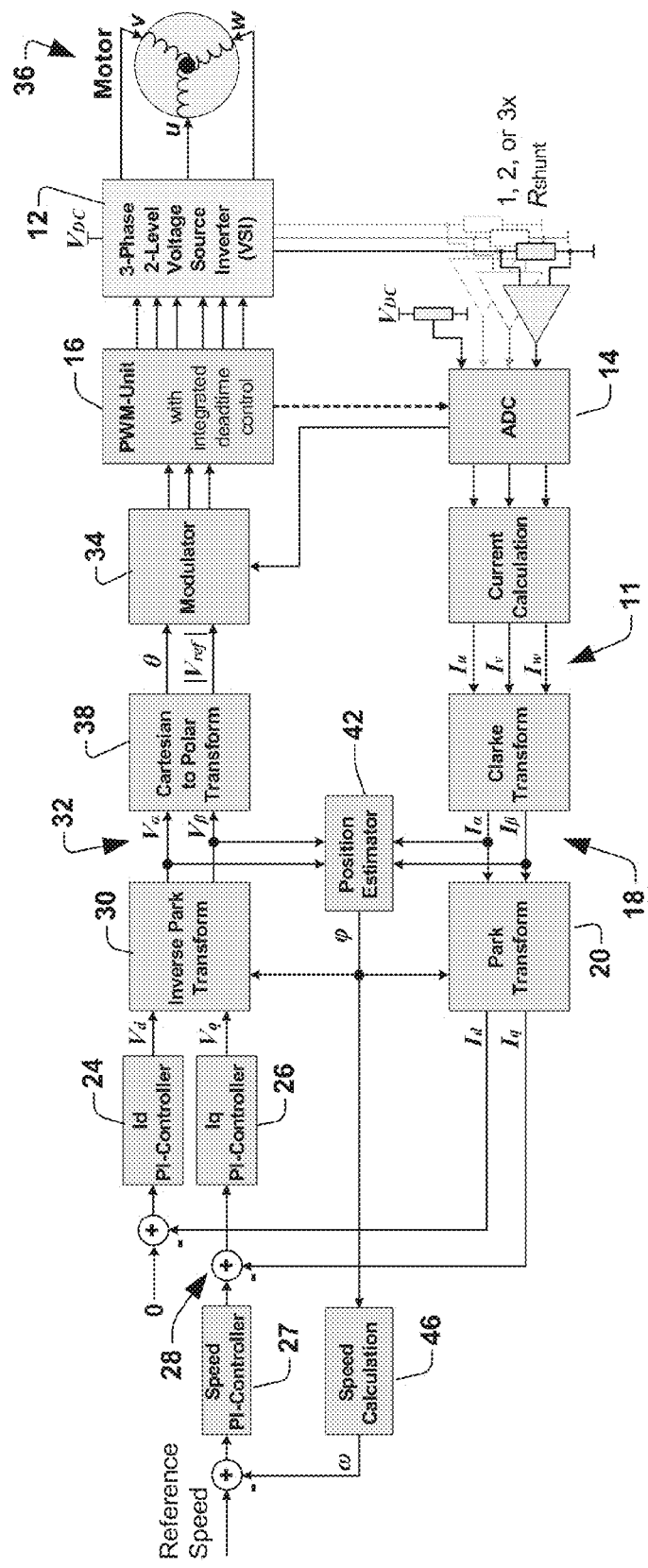
FIG. 1B is a schematic diagram illustrating a conventional sensorless FOC control strategy.

FIGS. 1A and 1B are two examples of existing FOC control strategies that can be used as benchmarks for proposed stator flux magnitude and direction control strategies. A detailed description of the existing FOC is provided below.

Normally, existing FOC for PMSMs uses a Clarke Transform to transform 3-phase currents $I_u$, $I_v$, and/or $I_w$ 11 measured by an analog to digital converter (ADC) 14 (ADC conversion can be triggered by a pulse width modulation (PWM) unit 16) to a stationary α-β reference frame as $I_\alpha$ and $I_\beta$ 18 (which are sinusoidal signals in steady state). Then a Park Transform 20 is used to transform $I_\alpha$ and $I_\beta$ 18 to another rotor d-q coordinate system as $I_d$ and $I_q$ 22, respectively. $I_d$ and $I_q$ are feedback signals of the FOC control loop and are almost constants at steady state. Proportional-integral (PI) controllers 24, 26, 27 are used for speed and current controls separately, to achieve controllable motor speed, torque and air gap flux. In general, the flux generating component $I_d$ is controlled to 0. It is also possible to control $I_d$ to negative values (i.e., a flux-weakening control) to extend the operating speed range of PMSMs. The speed PI controller 27 has an output 28 that provides the reference current for the torque generating component $I_q$. The current PI controllers 24, 26 output desired voltages $V_d$ and $V_q$ the motor phases should generate in d-q reference frame. Here $V_d$ and $V_q$ are almost constants in steady state. An Inverse Park Transform 30 is used to transform resultant voltages $V_d$ and $V_q$ to the stationary α/β reference frame as $V_\alpha$ and $V_\beta$ 32, which are sinusoidal signals in steady state. The amplitude and angle of voltage vector ($V_\alpha$, $V_\beta$) are the reference voltage for the space vector modulator (SVM) 34, which is used for the control of the PWM unit 16 to create 3-phase waveform outputs from the 3-phase 2-level voltage inverter 12 to drive the motor phases uvw 36. The Cartesian to Polar Transform 38 can be neglected if the microcontroller is not good at such calculation, instead the voltages $V_\alpha$ and $V_\beta$ are sent to the SVM modulator 34 directly. The ADC value of the inverter DC link voltage $V_{DC}$ (normally a voltage divider is needed) is also obtained regularly for SVM calculations.

The rotor position is obtained from a rotor position sensor 40 (such as an encoder, a resolver, Hall sensors, etc.) for sensored FOC, or a position estimator for sensorless FOC (see FIG. 1B). The rotor position 44 and speed calculations 46, speed PI control are the slow control loop as the motor mechanical time constant is typically much larger than the electrical time constant. The other computing blocks shown in FIGS. 1A and 1B comprise the fast current control loop and should be computed as fast as possible.

The stator flux magnitude and direction control strategies of the present disclosure control the stator flux magnitude and direction to achieve PMSM motor control with a high energy efficiency, and use extremely simple reference frame transformations to achieve fast and accurate control to solve the above-mentioned problems. Table 1 provided below compares the mathematical transformations used in existing FOC and the proposed new control strategies of the present disclosure.

The new control strategies use polar coordinates instead of Cartesian coordinates to represent motor space vectors, so that the complex Cartesian reference frame transformations (e.g., Park Transform and Inverse Park Transform with sine and cosine functions, which are crucial in existing FOC) can be replaced by simple subtraction and addition of angles while keeping space vector magnitudes unchanged. The subtraction and addition of angles can be computed precisely and instantly (an addition or subtraction operation can be done within only one, or a few system clocks with current microcontrollers). It will be shown below that the addition/subtraction of angles consume almost zero CPU time if using controllers such as, for example, Infineon microcontrollers with CORDIC coprocessors.

With simple reference frame transformations, the new PMSM control strategies optimize and speed-up the fast control loop, which will benefit the PMSM motor control with highly dynamic loading (such as a compressor or motor for electric propulsion). It also reduces CPU load and saves precious CPU time for other purposes (e.g., digital PFC, multiple PMSM motor drive, HMI, communications) in sophisticated systems, hence the microcontroller's potential and features can be fully used. Conversely, with the new stator flux magnitude and direction control strategies of the present disclosure, users could select a microcontroller with less computation power and lower cost to accomplish PMSM motor controls of the same quality as existing FOC.

It is worth noting that the transformations solving vector magnitudes and arctangent functions for the new control strategies are well suited for many microcontrollers, for example, Infineon microcontrollers with hardware CORDIC coprocessors to achieve decreased CPU time utilization. The new control strategies fully use the advantages of CORDIC coprocessors and showcase the prominent features of Infineon microcontrollers, for example.

TABLE 1

Mathematical transformations in existing FOC and proposed new control strategies

| Transformation | For Existing FOC | For Proposed New Control Strategies |
|---|---|---|
| uvw to α-β Transform | Clarke Transform: $I_\alpha = I_u$ $I_\beta = (I_u + 2I_v)/\sqrt{3}$ $(I_u + I_v + I_w = 0)$ In matrix form: $\begin{bmatrix} I_\alpha \\ I_\beta \end{bmatrix} = \begin{bmatrix} 1 & 0 \\ 1/\sqrt{3} & 2/\sqrt{3} \end{bmatrix} \begin{bmatrix} I_u \\ I_v \end{bmatrix}$ | Same as existing FOC |
| Stationary coordinate system to rotating coordinate system Transform | Park Transform: $I_d = I_\alpha \cos(\phi) + I_\beta \sin(\phi)$ $I_q = -I_\alpha \sin(\phi) + I_\beta \cos(\phi)$ In matrix form: $\begin{bmatrix} I_d \\ I_q \end{bmatrix} = \begin{bmatrix} \cos(\varphi) & \sin(\varphi) \\ -\sin(\varphi) & \cos(\varphi) \end{bmatrix} \begin{bmatrix} I_\alpha \\ I_\beta \end{bmatrix}$ | Subtraction of angles: $\Gamma = \gamma - \phi\ (\pm 2\ m\pi)$ where $\Gamma = \arctan\left(\dfrac{I_q}{I_d}\right)$ $\gamma = \arctan\left(\dfrac{I_\beta}{I_\alpha}\right)$ $\varphi$ - Rotor position/angle $m = 0, \pm 1, \pm 2, \pm 3,$ or ... * Magnitude maintains, i.e.: $|I| = \sqrt{I_d^2 + I_q^2} = \sqrt{I_\alpha^2 + I_\beta^2}$ |

TABLE 1-continued

Mathematical transformations in existing FOC and proposed new control strategies

| Transformation | For Existing FOC | For Proposed New Control Strategies |
|---|---|---|
| Rotating coordinate system to stationary coordinate system Transform | Inverse Park Transform:<br>$V_\alpha = V_d\cos(\phi) - V_q\sin(\phi)$<br>$V_\beta = V_d\sin(\phi) + V_q\cos(\phi)$<br>In matrix form:<br>$\begin{bmatrix} V_\alpha \\ V_\beta \end{bmatrix} = \begin{bmatrix} \cos(\varphi) & -\sin(\varphi) \\ \sin(\varphi) & \cos(\varphi) \end{bmatrix} \begin{bmatrix} V_d \\ V_q \end{bmatrix}$ | Addition of angles:<br>$\theta = \Theta + \phi\ (\pm 2\ n\pi)$<br>where $\theta = \arctan\left(\dfrac{V_\beta}{V_\alpha}\right)$<br>$\Theta = \arctan\left(\dfrac{V_q}{V_d}\right)$<br>$\varphi$ - Rotor position/angle<br>$n = 0, \pm 1, \pm 2, \pm 3, \text{ or }\ldots$ **<br>Magnitude maintains, i.e.:<br>$\|V_{ref}\| = \sqrt{V_\alpha^2 + V_\beta^2} = \sqrt{V_d^2 + V_q^2}$ |
| Cartesian to Polar Transform | $\|V_{ref}\| = \sqrt{V_\alpha^2 + V_\beta^2}$<br>$\theta = \arctan\left(\dfrac{V_\beta}{V_\alpha}\right)$ | $\|I\| = \sqrt{I_\alpha^2 + I_\beta^2}$<br>$\gamma = \arctan\left(\dfrac{I_\beta}{I_\alpha}\right)$ |
| Polar to Cartesian Transform | Not used | For sensorless new strategies only:<br>$V_\alpha = \|V_{ref}\|\cos(\theta)$<br>$V_\beta = \|V_{ref}\|\sin(\theta)$ |

Note
*: Mathematically m can be any integers. Usually select one m so that Γ is near to π/2.
Note
**: Mathematically n can be any integers. Usually select only one n (e.g.: n = 0)

One aspect of the disclosure involving stator flux magnitude and direction control strategies for PMSM is that in steady state the magnitudes of all the PMSM motor space vectors (i.e., current space vector, stator and rotor magnetic flux space vectors, and voltage space vector) are constants while their directions are stationary in the rotating polar coordinate system which is fixed to the rotor. So it is possible to use proportion-integral-derivative (PID) type controllers to control the stator flux magnitude and direction to achieve constant speed and controlled torque for quiet motor operation, and also control the stator flux to be perpendicular to the rotor flux for maximum energy efficiency. With polar coordinate systems the reference frame transformations for motor control can be done by simple subtraction or addition of angles, so computation-friendly motor control and a fast control loop are achieved.

In the disclosure below, the proposed new PMSM control strategies are highlighted with a detailed description of the new control strategies, including coordinate systems, space vectors, PI controller, SVM, rotor position determination, and CORDIC.

Figure 2A:
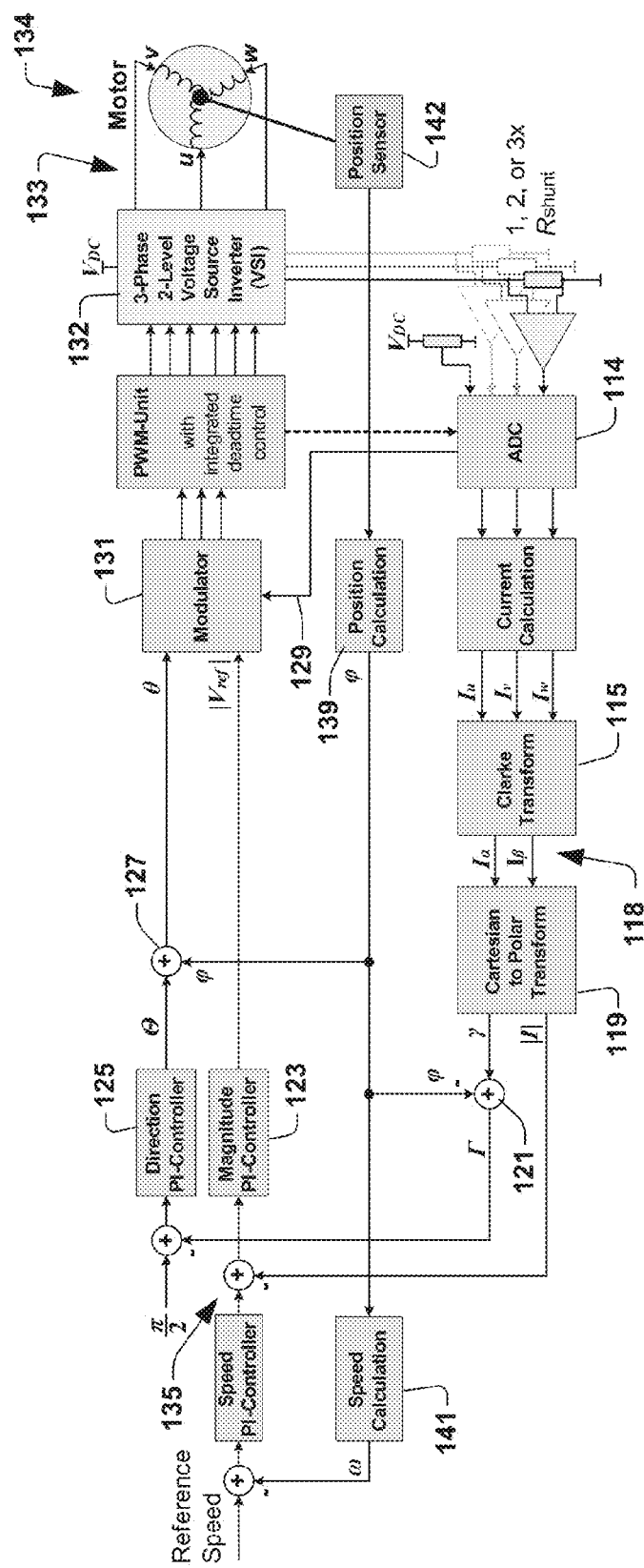
FIG. 2A is a schematic diagram illustrating a sensored stator flux magnitude and direction control strategy for PMSM in accordance with one embodiment of the disclosure.
Figure 2B:
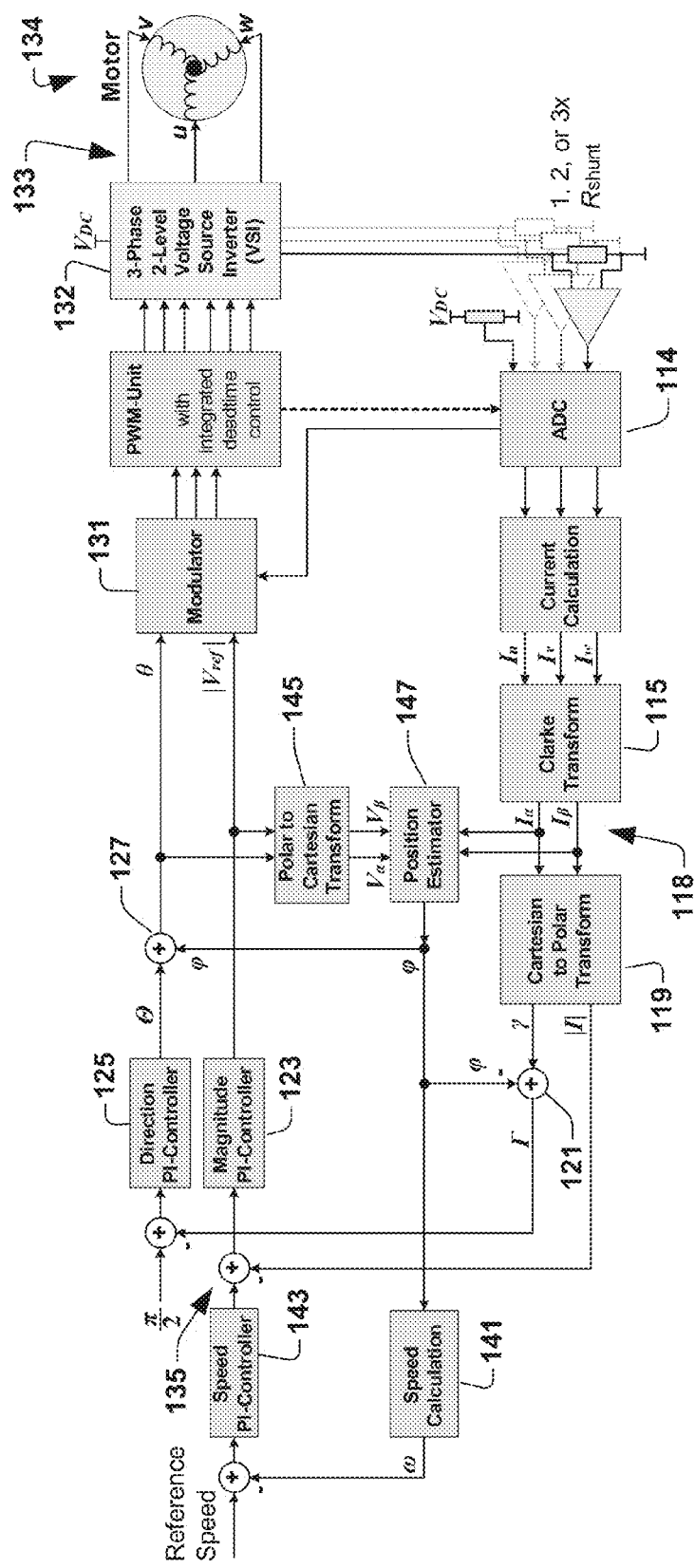
FIG. 2B is a schematic diagram illustrating a sensorless stator flux magnitude and direction control strategy for PMSM in accordance with another embodiment of the disclosure.

New sensored and sensorless stator flux magnitude and direction control strategies for PMSM are shown in FIGS. 2A-2B. A lot of varieties for the proposed stator flux magnitude and direction control strategies exist. FIGS. 3A-3D illustrate a few possible variations or embodiments that work for both sensored and sensorless control strategies as depicted in FIGS. 2A-2B. For simplicity, only the left sides, which are common for both sensored and sensorless new control strategies, are shown in FIGS. 3A-3D. Table 2 summarizes the computation formulas for the transformations shown in FIGS. 2A-2B and FIGS. 3A-3D.

TABLE 2

Computation formulas for proposed control strategies

| Transformation | Equations |
|---|---|
| Clark Transform | $I_\alpha = I_u$<br>$I_\beta = (I_u + 2I_v)/\sqrt{3}$<br>$(I_u + I_v + I_w = 0)$ |
| Cartesian to Polar Transform, and Subtraction of Angles | $\|I\| = \sqrt{I_\alpha^2 + I_\beta^2}$<br>$\gamma = \arctan\left(\dfrac{I_\beta}{I_\alpha}\right)$<br>$\Gamma = \gamma - \varphi$ |
| Addition of Angles Polar to Cartesian Transform (for sensorless new control strategies only) | $\theta = \Theta + \phi$<br>$V_\alpha = \|V_{ref}\|\cos(\theta)$<br>$V_\beta = \|V_{ref}\|\sin(\theta)$ |
| Pseudo Cartesian to Polar Transform, for FIG. 3 (c) and FIG. 3 (d) | $\|I\|^2 = I_\alpha^2 + I_\beta^2$<br>$\gamma = \arctan\left(\dfrac{I_\beta}{I_\alpha}\right)$ |

In the new control strategies shown in FIGS. 2A-2B, after ADC conversions 114 and Clarke Transform 115 to get currents $I_\alpha$ and $I_\beta$ 118, a Cartesian to Polar Transform 119 is used to get the magnitude |I| and direction γ of the current space vector. Instead of using a complex Park Transform 20 (see FIG. 1A), subtractions of angles Γ=γ−φ at 121 achieve the transformation from the stationary coordinate system to the rotating coordinate system. To obtain maximum torque and power efficiency, magnitude and direction PI controllers 123 and 125 are used to control the magnitude and direction of the voltage space vector, respectively to make the stator flux space vector perpendicular to the rotor magnetic field (i.e., forces Γ to be π/2 (or −π/2)). It is also possible to control Γ between π and π/2 to decrease the magnetic flux of the motor air gap (i.e., flux-weakening control) to extend the operating speed range of PMSMs. A simple addition of angles θ=Θ+φ at 127 accomplishes the transformation from the rotating coordinate system back to the stationary coordinate system, doing the same job of an Inverse Park Transform 30 of existing FOC (see FIG. 1A). The magnitude $|V_{ref}|$ and angle θ of the voltage space vector, together with the inverter DC link voltage information 129, are sent to SVM 131 to control the inverter 132 output 133 for the motor 134.

The speed PI controller output 135 is the reference for the magnitude PI controller 123. The rotor position 139 and speed calculations 141 from a position sensor 142, speed PI control 143 are slow control loop. Note that in sensorless control as shown in FIG. 2B, a Polar to Cartesian Transform 145 is used in the slow control loop to generate $V_\alpha$ and $V_\beta$ for a position estimator 147. The other computing blocks shown in FIG. 2B are part of the fast stator flux control loop.

One advantageous feature of the proposed new stator flux magnitude and direction control strategies is that they do not have Park Transform and Inverse Park Transforms which were heretofore essential to existing FOC control strategies. The fast control loop becomes much more simple and fast. Note that less calculations and more simple calculations also mean less accumulative calculation errors, especially for low-end microcontrollers To provide the highest performance for both sensored and sensorless new control strategies as shown in FIGS. 2A-2B, two calculations: 1) the Cartesian to Polar Transform 119 to get the magnitude $|I|$ and the angle γ, and 2) the subtraction 121 of angles Γ=γ−φ, can be computed with one single CORDIC calculation if using an Infineon microcontroller with CORDIC coprocessor. In other words, both calculations consume almost no CPU time. For the new sensorless control strategy as shown in FIG. 2B, the Polar to Cartesian Transform 145 to get $V_\alpha$ and $V_\beta$ can be computed simultaneously by the CORDIC coprocessor of an Infineon microcontroller while the CPU is computing for the SVM modulator 131, or using a look-up table of sine functions from 0 to 90° which can be re-used by the SVM modulator 131 (i.e., to calculate Equations (6) and (7) discussed infra) so the memory usage is maximally optimized, or others.

Figure 3A:
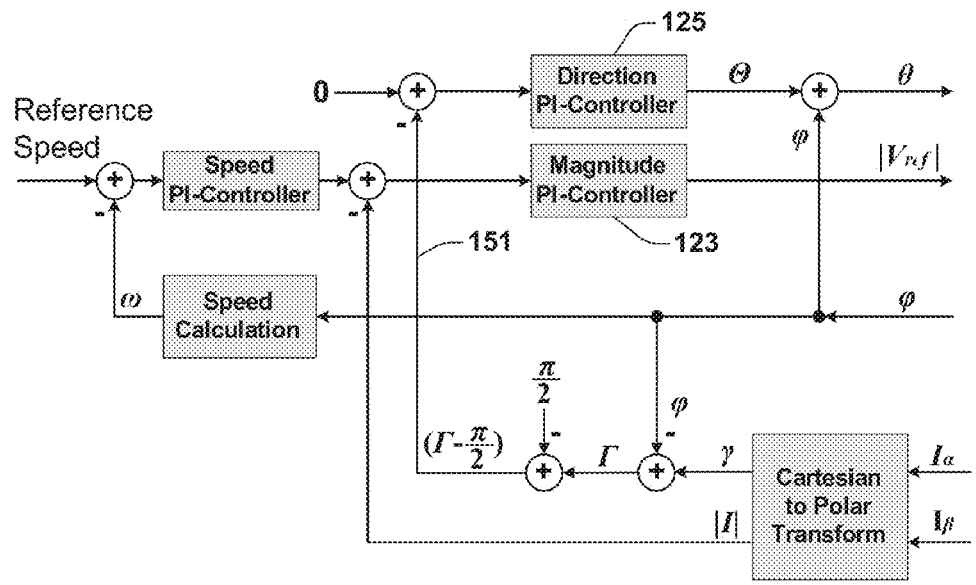
FIGS. 3A-3D are schematic diagrams illustrating a portion of the circuits of FIGS. 2A and 2B according to alternative embodiments of the disclosure.

In one embodiment, for both sensored and sensorless new control strategies, they can use (Γ−π/2) as feedback 151 for the direction PI controllers 125, but control (Γ−π/2) to 0 instead, as shown in FIG. 3A.

Figure 3B:
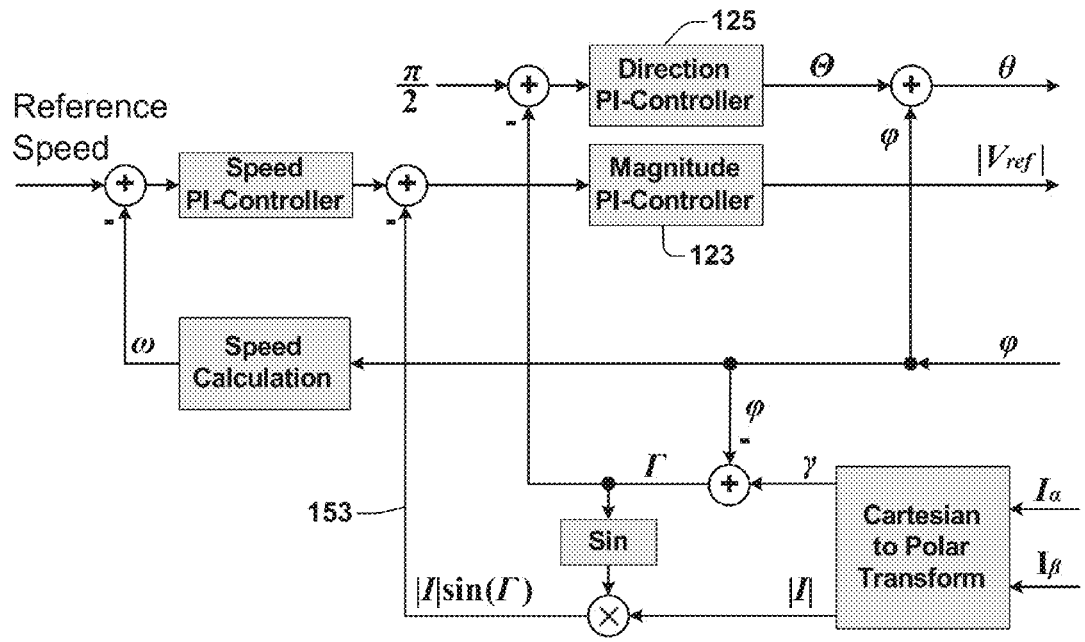

On the feedback path 153 to the magnitude PI controllers 123 of sensored and sensorless new control strategies, sine functions may be employed in some applications (i.e., use torque generating component $|I|\sin(\Gamma)$) as the feedback 153 as shown in FIG. 3B. In steady state the direction PI controller 125 forces Γ to be close to π/2, hence $|I|\sin(\Gamma)$ is very close to $|I|$ and the original control strategies shown in FIGS. 2A-2B can be used directly. In case Γ is far from π/2 in a transient state, the sine function can be calculated using the same look-up table mentioned above. Alternatively, the sine function can be computed concurrently by the CORDIC coprocessor of an Infineon microcontroller when the CPU is computing for the direction PI controller 125 to speed-up the fast control loop calculations.

Figure 3C:
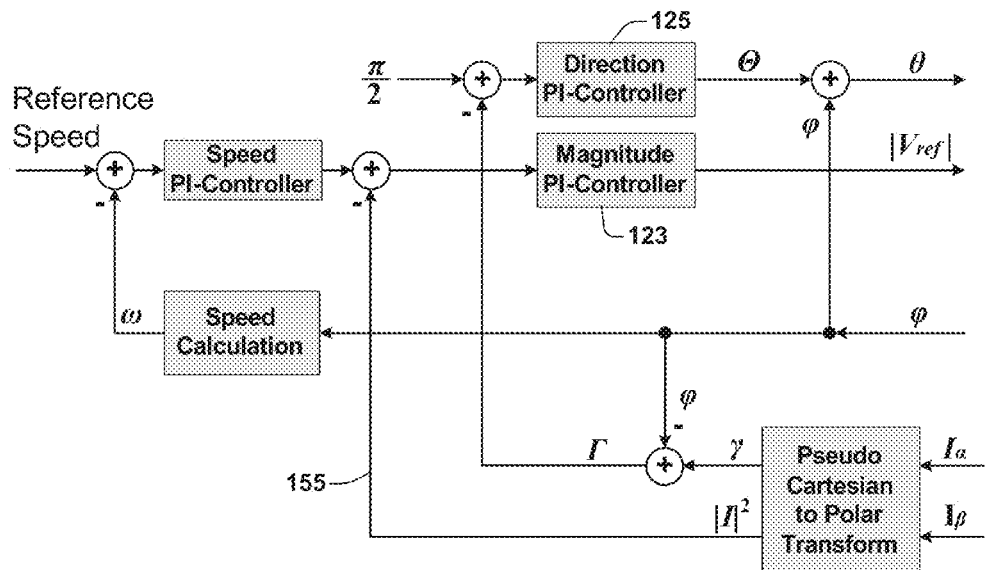

As shown in FIG. 3C, it is also possible to use $|I|^2 = I_\alpha^2 + I_\beta^2$ instead of $|I|$ as the feedback 155 of the magnitude PI controllers 123 for both new control strategies as shown in FIGS. 2A-2B in case the selected microcontroller is not good at computing square root function, which again saves precious CPU time.

Figure 3D:
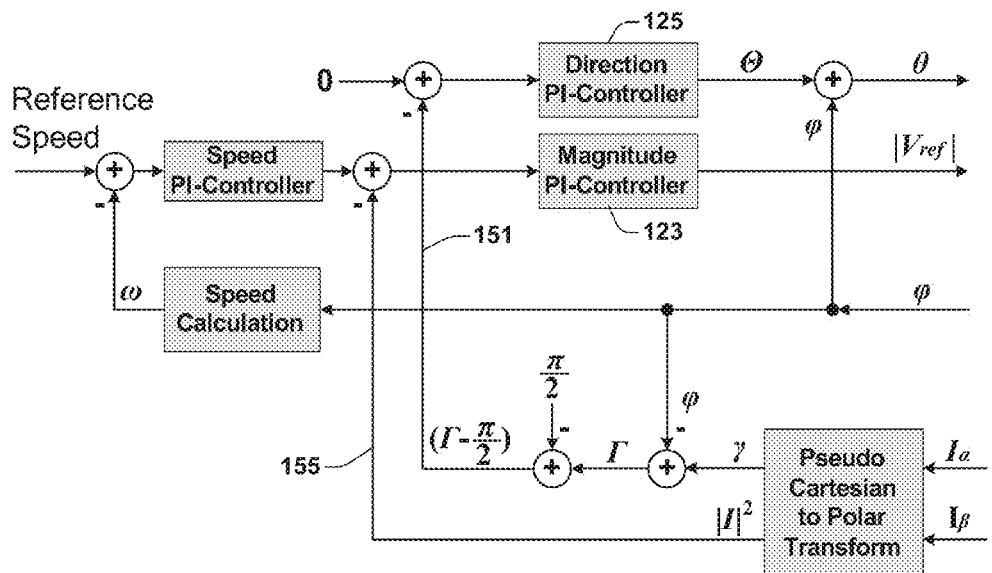

Depending on different system requirements, the final control strategies can be any combinations of the new control strategies as shown in FIGS. 2A-2B and FIGS. 3A-3D. For example, FIG. 3D is actually a combination of the strategies shown in FIG. 3A and FIG. 3C, respectively.

The discussion below describes the coordinate systems, space vectors, PI controller, SVM, rotor position determination, and CORDIC used in the new stator flux magnitude and direction control strategies in accordance with one embodiment of the disclosure.

Figure 4:
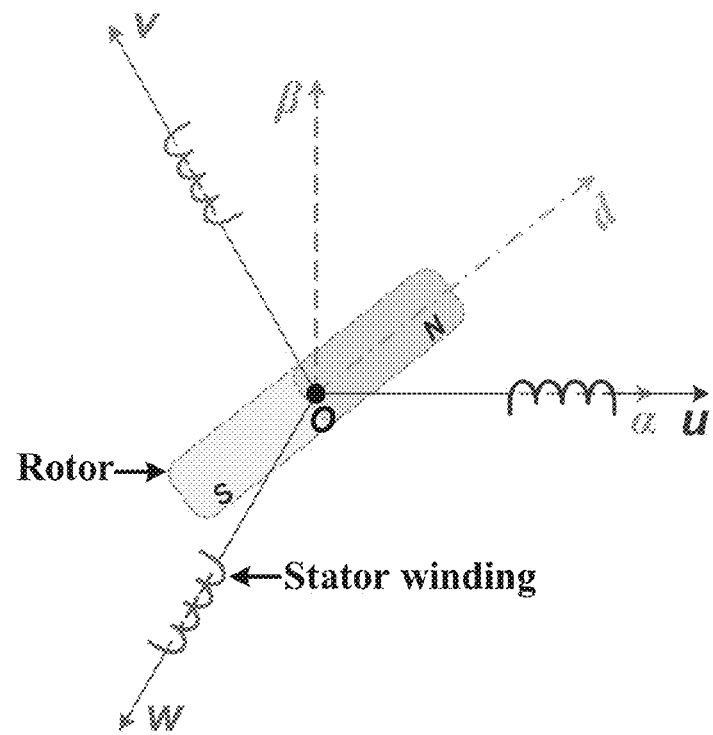
FIG. 4 is a diagram illustrating a coordinate system for a 3-phase 2-pole PMSM motor in accordance with one embodiment of the disclosure.

The coordinate systems for a 3-phase 2-pole PMSM motor are shown below in Table 3 and FIG. 4. Polar coordinate system Od is fixed to the rotor and rotating together, with its polar axis Od in the direction from the rotor permanent magnet south pole (S) to north pole (N). Note the new control strategies do not use rotor d-q Cartesian coordinate system which is all-important in the existing FOC.

TABLE 3

Coordinate systems for stator flux magnitude and direction control strategies

| Coordinate System | | Stationary | Rotating |
|---|---|---|---|
| 3-phase (electrically 120° separated) | uvw | ✓ | |
| Cartesian (electrically orthogonal) | α-β | ✓ | |
| Polar | Ou | ✓ | |
| | Od | | ✓ |

Figure 5:
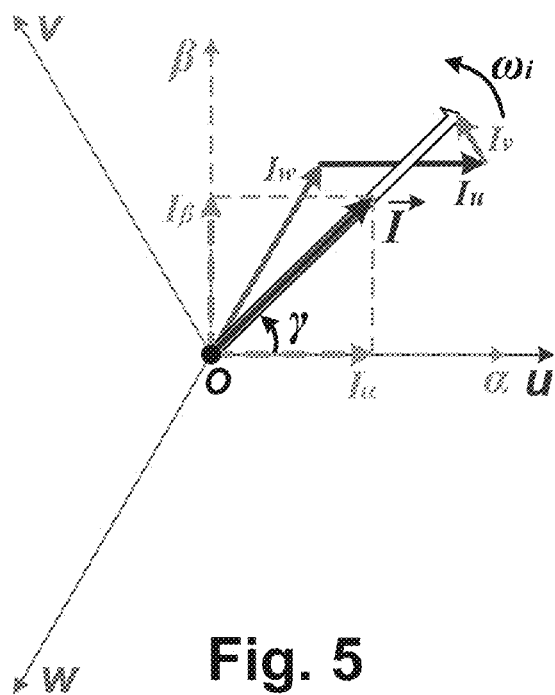
FIG. 5 is a diagram illustrating a coordinate system wherein vector addition of current gives a current space vector having Cartesian coordinates in accordance with one embodiment of the disclosure.
Figure 6:
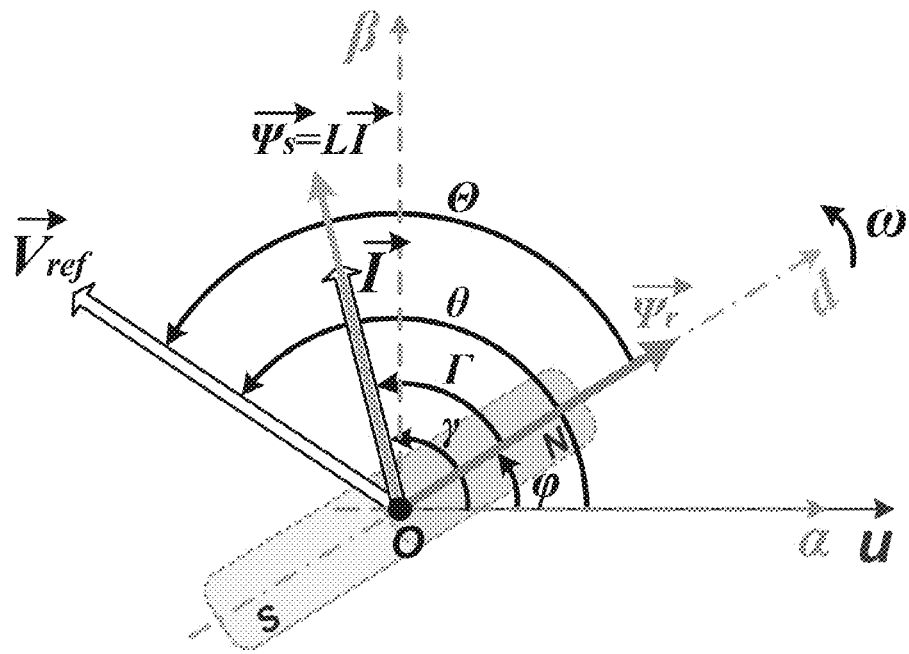
FIG. 6 is a diagram illustrating a coordinate system in which a rotating stator flux space vector that represents the rotating stator magnetic flux is illustrated in accordance with one embodiment of the disclosure.

3-phase 120° separated currents $I_u$, $I_v$ and $I_w$ of motor stator windings will generate three non-rotating but pulsating magnetic fields in u, v and w directions respectively, resulting in a rotating magnetic field (stator flux space vector). Coincidently, vector addition of $I_u$, $I_v$, and $I_w$ gives a current space vector $\vec{I}$ (its magnitude can be scaled down or up but no change of direction) rotating at speed $\omega_i$. In the stationary α-β reference frame, $\vec{I}$ has Cartesian coordinates $I_\alpha$ and $I_\beta$, as shown in FIG. 5. The rotating stator flux space vector $\vec{\Psi}_s$ has the same direction of $\vec{I}$ with their magnitudes proportional to each other, as shown in FIG. 6. So the rotating current space vector can represent the rotating stator magnetic flux. To control the rotating stator flux, it is easy to control the magnitude and direction of one single current space vector $\vec{I}$ instead of three currents $I_u$, $I_v$ and $I_w$.

Similarly, vector addition of 3-phase 120° separated stator phase voltages gives a rotating voltage space vector. Also, a rotating rotor permanent magnet generates a rotating rotor magnetic flux space vector.

The magnitudes and directions of the above-mentioned rotating space vectors can be represented by the radial coordinates and polar angles in polar coordinate systems, as shown in FIG. 6. Their coordinates in different coordinate systems are shown in the following Table 4.

TABLE 4

Coordinates of space vectors for stator flux magnitude and direction control strategies

| | Coordinates in Different Coordinate Systems | | | |
|---|---|---|---|---|
| Space Vector | uvw | α-β | Ou | Od |
| $\vec{I}$ | $I_u$, $I_v$, $I_w$ | $I_\alpha$, $I_\beta$ | $|I|$, Y | $|I|$, Γ |
| $\vec{V}_{ref}$ | $V_u$, $V_v$, $V_w$ | $V_\alpha$, $V_\beta$ | $|V_{ref}|$, θ | $|V_{ref}|$, Θ |
| $\vec{\Psi}_s$ | $LI_u$, $LI_v$, $LI_w$ | $LI_\alpha$, $LI_\beta$ | $L|I|$, Y | $L|I|$, Γ |
| $\vec{\Psi}_r$ | — | $\Psi_{r\alpha}$, $\Psi_{r\beta}$ | $\Psi_r$, φ | $\Psi_r$, 0 | where: $\vec{I}$—Stator current space vector $\vec{V}_{ref}$—Stator voltage space vector $\vec{\Psi}_s$—Stator magnetic flux space vector, $\vec{\Psi}_s = L\vec{I}$. Its magnitude and direction are controlled.

L—Stator winding inductance per phase $\vec{\Psi}_r$—Rotor permanent magnet(s) flux space vector. Its magnitude $\Psi_r$ can be derived from voltage constant, speed constant or torque constant in motor specifications φ—Rotor electrical position γ—Angle of current space vector in stationary Ou polar coordinate system Γ—Angle of current space vector in rotating Od polar coordinate system, Γ=γ−φ

Θ—Angle of voltage space vector in rotating Od polar coordinate system

θ—Angle of voltage space vector in stationary Ou polar coordinate system, θ=Θ+φ

Figure 7:
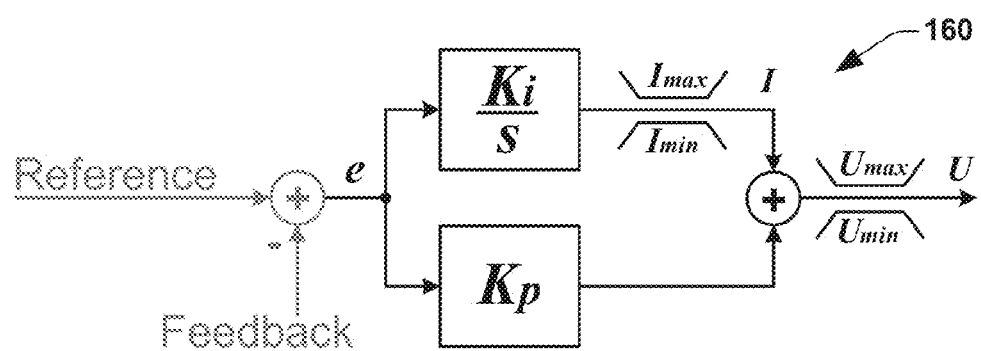
FIG. 7 is a schematic diagram illustrating a PI controller for controlling a rotor speed, stator magnetic flux magnitude and direction in accordance with one embodiment of the disclosure.

PI controllers are used for the rotor speed, stator magnetic flux magnitude and direction control. A PI controller is a special case of the PID controller in which the derivative of the error is not used. A PI controller 160 is shown in FIG. 7 according to one embodiment, and its equation is $$U(t) = K_p e(t) + \underbrace{K_i \int_0^t e(\tau)d\tau}_{I(t)} \quad (1)$$

where: e—error signal, it is reference value minus feedback value
- $K_p$—Proportional gain
- $K_i$—Integral gain
- t—Instantaneous time
- τ—Variable of integration; takes on values from time 0 to the present time t.
- I(t)—Integral term
- U(t)—Controller output A digital implementation of it in a microcontroller can be $$I(k) = K_i e(k) + I(k-1) \quad (2)$$

$$U(k) = K_p e(k) + I(k) \quad (3)$$

Both I and U in Equations (2) and (3) have minimum and maximum limits to avoid the unwanted windup situation (anti-windup).

Figure 8:
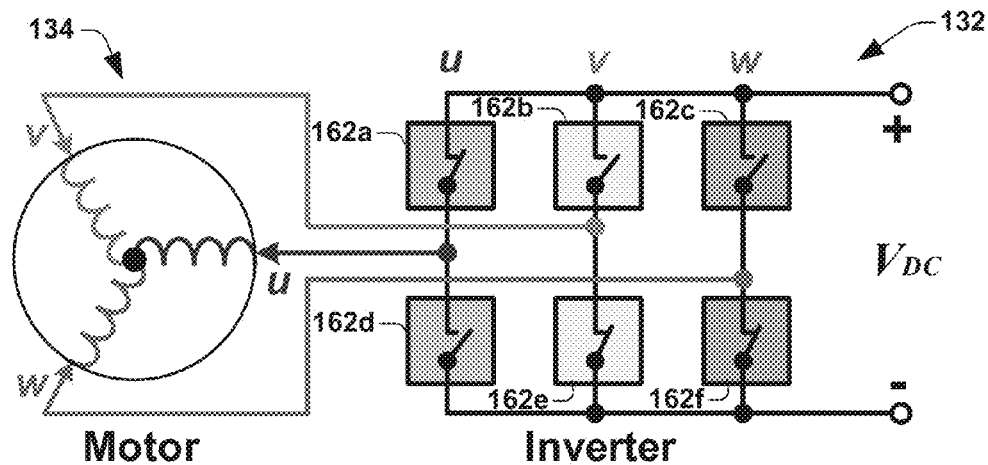
FIG. 8 is a schematic diagram illustrating a 3-phase 2-level inverter circuit for driving a motor in accordance with one embodiment of the disclosure.

The connection of a 3-phase 2-level voltage source inverter such as inverter 132 in FIGS. 2A-2B and a motor 134 are shown in FIG. 8. The six switching devices 162a-162f of inverter, which could be MOSFET, IGBT or similar parts, are controlled by microcontroller PWM signals (e.g., from the PWM unit in FIGS. 2A-2B). The motor windings can be wired in a star (as shown) or a delta. SVM 131 is used to control the PWM to create 3-phase waveforms to the motor windings.

Figure 9:
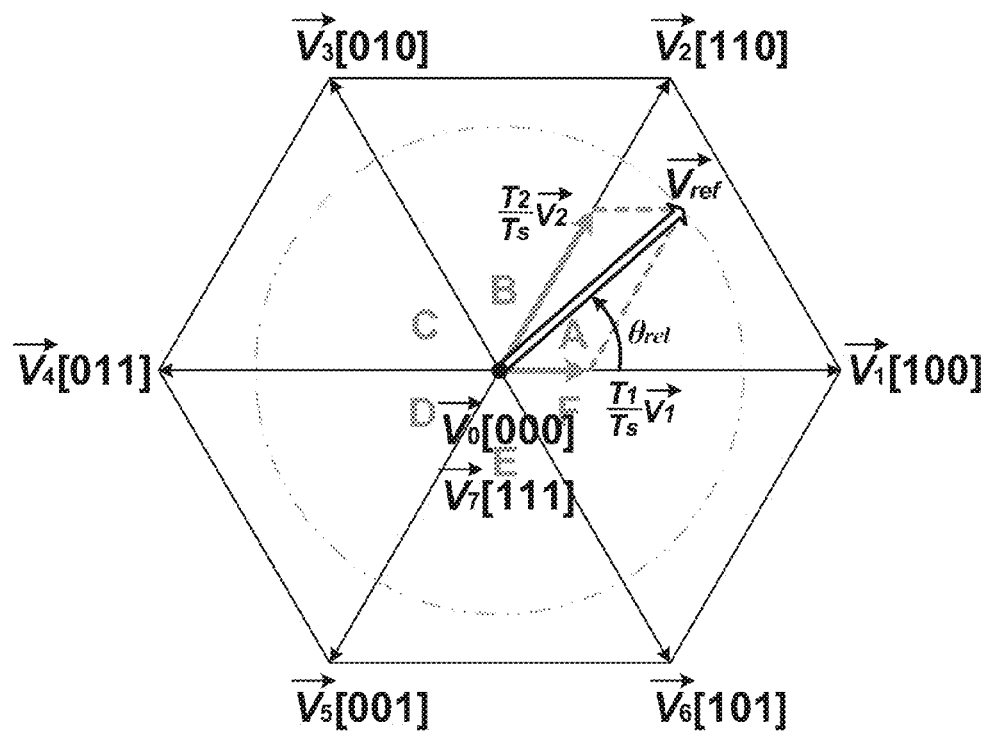
FIG. 9 is a space vector diagram illustrating the possible switching voltage vectors, both active and passive vectors, in accordance with one embodiment of the disclosure.

To avoid a short-circuit of the DC link voltage, the inverter 132 has only eight possible switching voltage vectors as shown in FIG. 9. $\vec{V}_1$ to $\vec{V}_6$ are active vectors, $\vec{V}_0$ and $\vec{V}_7$ do not generate any voltage difference in the three motor phases and are passive vectors (or zero vectors). The rotating voltage space vector $\vec{V}_{ref}$ is approximated by two adjacent active vectors (e.g., $\vec{V}_1$, $\vec{V}_2$ in Sector A) and one or both of the passive vectors (e.g., $\vec{V}_0$ only). The plane is dissected in six sectors from A to F and the angle θ of $\vec{V}_{ref}$ is transformed into the relative angle $\theta_{rel}$ in each sector. $T_1$, $T_2$ and $T_0$ correspond with the active vectors and passive vector(s), respectively (e.g., $\vec{V}_1$, $\vec{V}_2$, and $\vec{V}_0$ in Sector A).

Using the voltage space vector in Sector A as an example, the following shows the calculation. Using volt second balancing:

$$\vec{V}_{ref} = \frac{T_0}{T_S}\vec{V}_0 + \frac{T_1}{T_S}\vec{V}_1 + \frac{T_2}{T_S}\vec{V}_2 \quad (4)$$

$$T_S = T_0 + T_1 + T_2 \quad (5)$$

Solving the equation we have $$T_1 = \frac{\sqrt{3}\,|V_{ref}|T_S}{V_{DC}}\sin\left(\frac{\pi}{3} - \theta_{rel}\right) \quad (6)$$

$$T_2 = \frac{\sqrt{3}\,|V_{ref}|T_S}{V_{DC}}\sin(\theta_{rel}) \quad (7)$$

$$T_0 = T_S - T_1 - T_2 \quad (8)$$

where: $T_S$—Sampling period
- $T_0$—Time of zero vector(s) is applied. The zero vector(s) can be $\vec{V}_0[000]$, $\vec{V}_7[111]$, or both
- $T_1$—Time of active vector $\vec{V}_1$ is applied within one sampling period
- $T_2$—Time of active vector $\vec{V}_2$ is applied within one sampling period
- $V_{DC}$—Inverter DC link voltage Equations (6) and (7) can be calculated with different methods, e.g., use a look-up table for the sine function from 0 to 60° in microcontroller memory, or may be calculated by the CORDIC coprocessor of an Infineon microcontroller, for example.

There are many SVM schemes (e.g., symmetrical or asymmetrical 7-segment schemes, symmetrical or asymmetrical 5-segment scheme, and 3-segment scheme) that result in different quality and computational requirements. A particular SVM scheme can be selected based on microcontroller features and application requirements.

In sensored stator flux magnitude and direction control as illustrated in FIG. 2A, the position sensor 142 (such as an encoder, a resolver, Hall sensors, etc.) provides the information of rotor position. In sensorless stator flux magnitude and direction control, as illustrated in FIG. 2B, the rotor position can be extracted from rotor magnetic flux (to be elaborated below), BEMF, a position estimator 147 with PLL structure, or others.

Figure 10A:
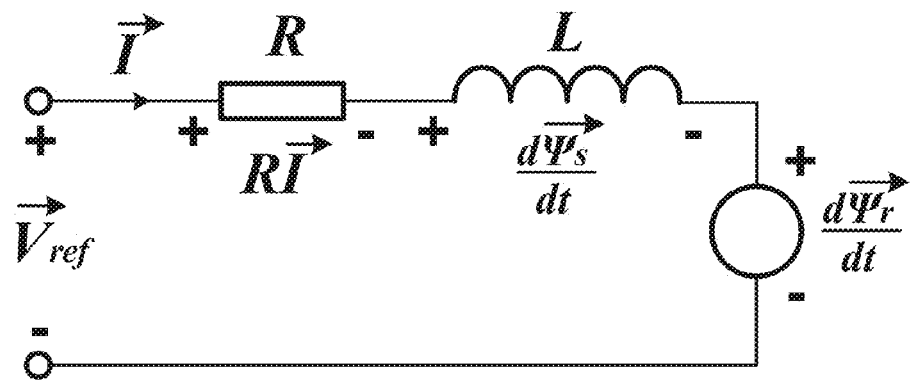
FIG. 10A is a schematic diagram illustrating an equivalent circuit of the electric subsystem of a PMSM in accordance with one embodiment of the disclosure.
Figure 10B:
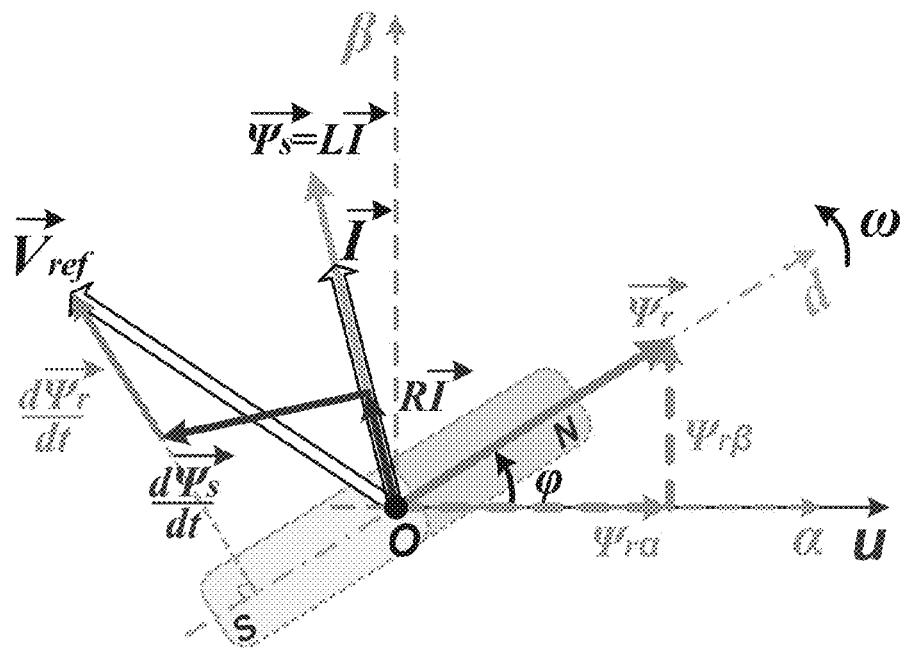
FIG. 10B is a diagram illustrating a coordinate system with the terms of a motor equation illustrated thereon in accordance with one embodiment of the disclosure.

An equivalent circuit of the electrical subsystem of a PMSM is shown in FIG. 10A. The motor equation is:

$$\vec{V}_{ref} = R\vec{I} + \frac{d\vec{\Psi}_s}{dt} + \frac{d\vec{\Psi}_r}{dt} \quad (9)$$

where:

R – Stator winding resistance per phase $R\vec{I}$ – Voltage drop on the stator winding resistor L – Stator winding inductance per phase -continued $\dfrac{d\vec{\Psi}_s}{dt}$ – Electromotive force induced by time-varying stator magnetic flux, $\dfrac{d\vec{\Psi}_s}{dt} = L\dfrac{d\vec{I}}{dt}$ $\dfrac{d\vec{\Psi}_r}{dt}$ – Electromotive force induced by rotating and hence time-varying rotor magnetic flux All the terms of Equation (9) are depicted in FIG. 10B. Integrating the equation and rearrange, we get $$\vec{\Psi}_r = \int_0^t (\vec{V}_{ref} - R\vec{I})dt - L\vec{I} \qquad (10)$$

Project both sides of Equation (10) to stationary α-β axes to get the coordinates of rotor flux space vector $$\Psi_{r\alpha} = \int_0^t (V_\alpha - RI_\alpha)dt - LI_\alpha \qquad (11)$$

$$\Psi_{r\beta} = \int_0^t (V_\beta - RI_\beta)dt - LI_\beta \qquad (12)$$

$I_\alpha$ and $I_\beta$ are real-time measured and calculated current values. $V_\alpha$ and $V_\beta$ are last control cycle calculation results and presently apply to the motor phases. The integrations shown in Equations (11) and (12) may be simplified by replacing the integrations by low pass filters with a very low cut-off frequency. The rotor position can be calculated by knowing the motor parameters R and L. The flux position estimator is $$\varphi = \arctan\left(\dfrac{\Psi_{r\beta}}{\Psi_{r\alpha}}\right) \qquad (13)$$

The rotor electrical speed is $$\omega = \dfrac{d\varphi}{dt} \qquad (14)$$

The proposed new stator flux magnitude and direction control strategies are well suited for various controllers, and in particular Infineon microcontrollers that have hardware CORDIC coprocessors, e.g., 8-bit microcontrollers XC83x, XC88x and XC87x. The following Table 5 gives examples of CORDIC computations that could be used in the new control strategies.

TABLE 5

Computations with CORDIC coprocessors of Infineon microcontrollers

| Operating Modes | CORDIC Coprocessor Initial Data | Final Result Data | Computations for New Control Strategies |
|---|---|---|---|
| Vectoring Mode | X<br>Y<br>Z | $X_{final} = K\sqrt{X^2 + Y^2}/MPS$<br>$Y_{final} = 0$<br>$Z_{final} = Z + \arctan\left(\dfrac{Y}{X}\right)$<br>where K ≈ 1.64676<br>MPS - X and Y magnitude prescaler, e.g.: MPS = 1, 2, or 4, depending on microcontroller register setting<br>1). To solve the Cartesian to Polar Transform, set $X = I_\alpha/K$, $Y = I_\beta/K$, and $Z = 0$.<br>2). Specially, set $Z = -\phi$ to calculate Cartesian to Polar Transform and angle subtraction with one single CORDIC calculation | Cartesian to Polar Transform:<br>$\|I\| = \sqrt{I_\alpha^2 + I_\beta^2}$<br>$\gamma = \arctan\left(\dfrac{I_\beta}{I_\alpha}\right)$<br>Subtraction of Angles:<br>$\Gamma = \gamma - \phi$ |
| Rotation Mode | X<br>Y<br>Z | $X_{final} = K[X\cos(Z) - Y\sin(Z)]/MPS$<br>$Y_{final} = K[Y\cos(Z) + X\sin(Z)]/MPS$<br>$Z_{final} = 0$<br>where K ≈ 1.64676<br>MPS - X and Y magnitude prescaler, e.g.: MPS = 1, 2, or 4, depending on microcontroller register setting<br>1). In case it is needed to use CORDIC to solve the Polar to Cartesian Transform, set $X = \|V_{ref}\|/K$, $Y = 0$, $Z = \theta$ | Polar to Cartesian Transform:<br>$V_\alpha = \|V_{ref}\|\cos(\theta)$<br>$V_\beta = \|V_{ref}\|\sin(\theta)$ |

For the sensored stator flux magnitude and direction control strategy shown in FIG. 2A, it is possible to use a new direct uvw to Polar Transform as shown below:

$$|I| = K_1\sqrt{I_u^2 + I_v^2 + I_u I_v} \qquad (15)$$

$$\gamma = \arctan\left(\dfrac{I_u + 2I_v}{\sqrt{3} \cdot I_u}\right) \qquad (16)$$

where: $K_1$—Scaling factor for current space vector magnitude and $K_1 = \sqrt{3}$, which can be neglected here (i.e., make $K_1 = 1$). The scaling factor $\sqrt{3}$ can be combined with other scaling factors of the control strategy (e.g., current sensing and amplification, analog-to-digital conversion, etc).

Figure 11:
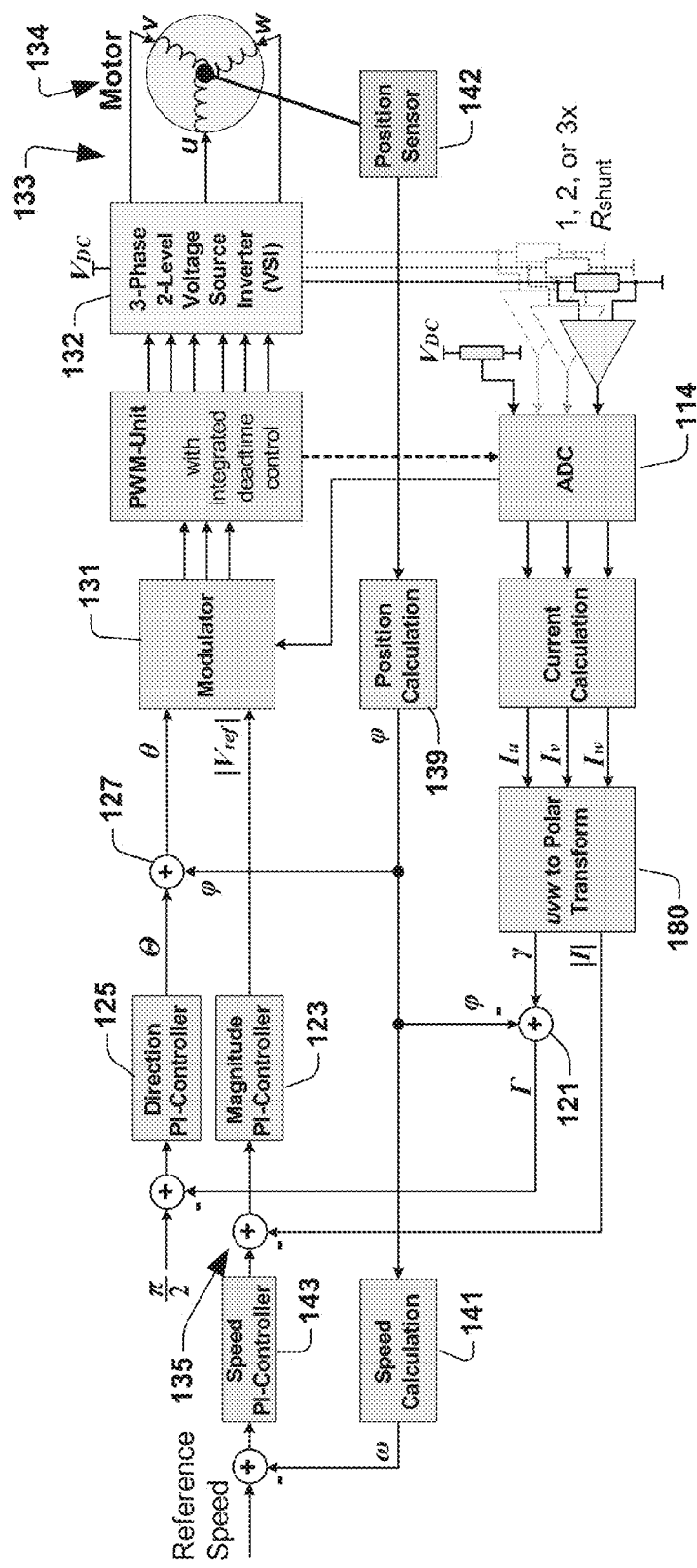
FIG. 11 is a schematic diagram illustrating a sensored stator flux magnitude and direction control strategy for PMSM employed a direct uvw to polar transform in accordance with another embodiment of the disclosure.

A sensored stator flux magnitude and direction control strategy according to another embodiment with a direct uvw to Polar Transform 180 (i.e., without Clarke Transform) is shown in FIG. 11.

Of course, the various embodiments as shown in FIGS. 3A-3D can be combined to the control strategy shown in FIG. 11. For example, in case the chosen microcontroller is not good at computing a square root function, it is possible to use $|I|^2$ instead of $|I|$ as the feedback of the magnitude PI controller 123. So in such an instance we come out with a new pseudo uvw to Polar Transform 182 as shown below:

$$|I|^2 = I_u^2 + I_v^2 + I_u I_v \quad (15)$$

$$\gamma = \arctan\left(\frac{I_u + 2I_v}{\sqrt{3} \cdot I_u}\right) \quad (16)$$

Figure 12:
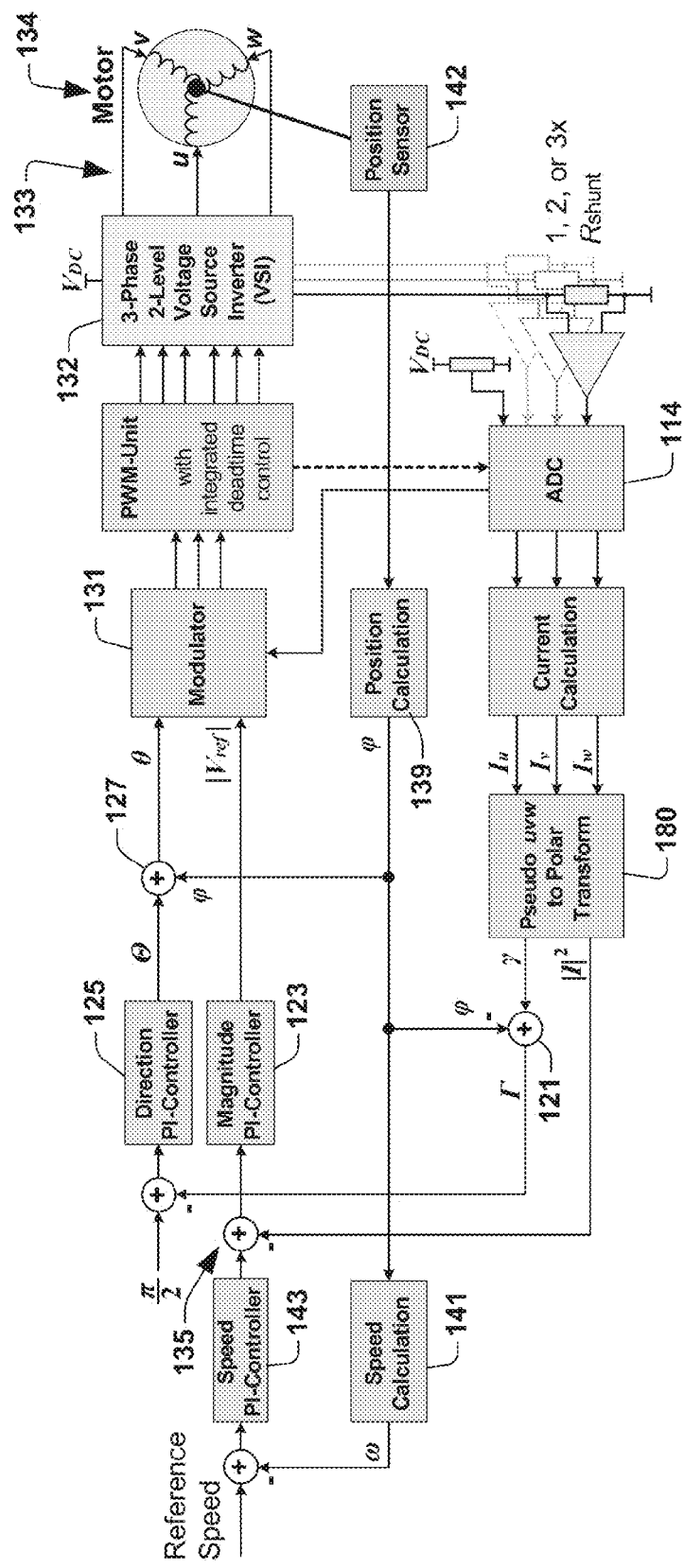
FIG. 12 is a schematic diagram illustrating a sensored stator flux magnitude and direction control strategy for PMSM employed a pseudo uvw to polar transform in accordance with another embodiment of the disclosure.

A sensored new stator flux magnitude and direction control strategy with a pseudo uvw to Polar Transform 182 (i.e., without Clarke Transform anymore) is shown below in FIG. 12.

It will be appreciated that equivalent alterations and/or modifications may occur to those skilled in the art based upon a reading and/or understanding of the specification and annexed drawings. For example, the above examples are discussed in the context of PMSM motors, but the present disclosure is equally applicable for sensored and sensorless FOC control for other AC motors such as Alternating Current Induction Motor (ACIM). The disclosure herein includes all such modifications and alterations and is generally not intended to be limited thereby.

In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated herein.

What is claimed is:

1. A motor control system, comprising:
   a transform component configured to receive current values associated with a motor being driven by the motor control circuit, and output polar coordinate values representing a magnitude component and a direction component of a current space vector, wherein the transform component comprises:
   a Clarke transform component configured to receive the current values associated with respective phases of the motor being drive, and convert the current values into a Cartesian space to obtain Cartesian current values of the current space vector;
   a Cartesian to polar transform component configured to receive the Cartesian current values and convert such into the magnitude component and the direction component of the current space vector; and
   a subtraction circuit configured to subtract a position angle from the direction component to transform the direction component from a stationary coordinate system to a rotating coordinate system; and
   a control component configured to receive the magnitude component and the direction component of the current space vector, and generate motor control signals for driving the motor, wherein the control component further comprises:
   a magnitude controller configured to receive the magnitude component of the current space vector and a feedback control value associated with a speed value and a reference value, and generate a magnitude of a voltage space vector based thereon, wherein the speed value is calculated from the position angle;
   a direction controller configured to control a direction of the voltage space vector to make a stator flux space vector perpendicular to a rotor magnetic field of the motor being driven; and
   an addition circuit to add the position angle to the voltage space vector to transform the voltage space vector from a rotating coordinate system to a stationary coordinate system;
   a polar to Cartesian transform component configured to receive the voltage space vector in the stationary coordinate system and generate the voltage space vector in Cartesian coordinates in the stationary coordinate system; and
   position estimator circuit configured to receive the voltage space vector from the polar to Cartesian transform component and the current space vector from the Clark transform component, and generate the position angle as an estimate based on the Cartesian coordinates of the voltage space vector and the Cartesian components of the current space vector.

2. The motor control system of claim 1, wherein the control component further comprises:
   a space vector modulator configured to receive the voltage space vector magnitude and direction from the magnitude controller and the direction controller, respectively, and generate control signals for control of an inverter to drive the motor.

3. The motor control system of claim 1, wherein the transform component is configured to provide a direction transform from current values to polar format comprising a magnitude component and a direction component of the current space vector.

4. A motor control system, comprising:
   a transform component configured to receive current values associated with a motor being driven by the motor control circuit, and output polar coordinate values representing a first current magnitude component and a first current direction component of a current space vector in a stationary polar coordinate system;
   a control component configured to:
   receive the first current magnitude component and the first current direction component of the current space vector and a position angle; and
   transform the current space vector into a rotating polar coordinate system fixed to a rotor of the motor by subtracting the position angle from the first current direction component to calculate a second current direction component, such that the transformed current space vector comprises the first current magnitude component and the second current direction component;
   a voltage direction controller configured to directly input the second current direction component and control a direction component of a polar voltage space vector based on the second current direction component;

a voltage magnitude controller configured to directly input the first current magnitude component and control a magnitude component of the polar voltage space vector based on the first current magnitude component; and wherein the control component is configured to add the position angle to the direction component of the polar voltage space vector to transform the polar voltage space vector into the stationary polar coordinate system; and a space vector modulator configured to receive the transformed voltage space vector and use the voltage space vector in generating motor control signals for driving the motor.

5. The motor control system of claim 4, wherein the control component further comprises:

a pulse width modulator configured to receive the control signals from the space vector modulator and generate pulse width modulation signals in response thereto for driving switches of the inverter.

6. The motor control system of claim 4, wherein the transform component is configured to provide a pseudo direct transform from current values to the stationary polar coordinate format comprising a square of the magnitude component and a direction component of the current space vector.

7. The motor control system of claim 4, wherein:

the voltage magnitude controller is configured to control a magnitude of the voltage space vector constant in the rotating polar coordinate system;

the voltage direction controller is configured to control a direction of the voltage space vector to be perpendicular to a rotor magnetic field in the rotating polar coordinate system.

8. The motor control system of claim 4, wherein the space vector modulator is configured to receive DC link voltage information and use such DC link voltage information along with the values of the voltage space vector in generating motor control signals for driving the motor.

* * * * *